US007069557B2

(12) United States Patent
Alferness

(10) Patent No.: US 7,069,557 B2
(45) Date of Patent: Jun. 27, 2006

(54) NETWORK PROCESSOR WHICH DEFINES VIRTUAL PATHS WITHOUT USING LOGICAL PATH DESCRIPTORS

(75) Inventor: Merwin Herscher Alferness, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 10/153,995

(22) Filed: May 23, 2002

(65) Prior Publication Data
US 2003/0220959 A1 Nov. 27, 2003

(51) Int. Cl.
*G06F 9/46* (2006.01)
(52) U.S. Cl. .................. 718/102; 709/230; 709/236; 370/230; 370/233; 370/235; 370/395.2; 370/395.72; 370/397; 370/413; 712/6; 712/16
(58) Field of Classification Search ............ 718/1–108; 712/6, 16; 709/230–236; 370/230–413
See application file for complete search history.

(56) References Cited

U.S. PATENT DOCUMENTS

| 5,231,631 | A | * | 7/1993 | Buhrke et al. ............... 370/230 |
| 5,274,768 | A | * | 12/1993 | Traw et al. .................. 709/236 |
| 5,280,476 | A | * | 1/1994 | Kojima et al. ............... 370/397 |
| 5,311,509 | A | * | 5/1994 | Heddes et al. ............... 370/397 |
| 5,381,411 | A | * | 1/1995 | Ohno et al. .................. 370/232 |
| 5,535,197 | A | * | 7/1996 | Cotton ................... 370/395.72 |
| 5,557,607 | A | * | 9/1996 | Holden ....................... 370/413 |
| 5,568,486 | A | * | 10/1996 | Huscroft et al. ......... 370/395.2 |
| 5,844,890 | A | * | 12/1998 | Delp et al. .................... 370/230 |
| 5,991,867 | A | * | 11/1999 | Fosmark ....................... 712/16 |
| 5,995,995 | A | * | 11/1999 | Thomas et al. ............. 718/100 |
| 6,028,843 | A | * | 2/2000 | Delp et al. .................... 370/235 |
| 6,198,724 | B1 | * | 3/2001 | Lam et al. .................... 370/233 |
| 6,208,661 | B1 | * | 3/2001 | Marshall ...................... 370/412 |

OTHER PUBLICATIONS

Pocher et al., "A Distributed Protocol To Schedule And Monitor ATM Real-Time Traffic", IEEE, Mar. 1997, pp. 531-534.*
Schormans, "Analysis Of ATM Network Access", IEEE, 1993, pp. 10/1-10/6.*
Rathnavelu, "Adaptive Time Slot: A Scheduling Scheme For ATM End points", IEEE, May 1996, pp. 2118-2122.*

* cited by examiner

*Primary Examiner*—Meng-Al T. An
*Assistant Examiner*—Jennifer N. To
(74) *Attorney, Agent, or Firm*—Dugan & Dugan

(57) ABSTRACT

A virtual path feature in which several virtual channels share an assigned amount of bandwidth is implemented in a network processor. The network processor maintains a schedule indicative of respective times at which a plurality of virtual channels are to be serviced. An entry is read from the schedule. The entry corresponds to a current transmit cycle and includes a pointer to a channel descriptor for a virtual channel to be serviced in the current transmit cycle. A data cell for the virtual channel to be serviced in the current cycle is transmitted. An entry is added to the schedule to point to a channel descriptor that is pointed to by the channel descriptor for the virtual channel serviced in the current transmit cycle.

4 Claims, 4 Drawing Sheets

NETWORK PROCESSOR WHICH DEFINES VIRTUAL PATHS WITHOUT USING LOGICAL PATH DESCRIPTORS

FIELD OF THE INVENTION

The present invention is concerned with data communication systems and is more particularly concerned with a scheduling function of a network processor.

BACKGROUND OF THE INVENTION

FIGS. 1A and 1B are a block diagram illustration of a conventional network processing chip 10 in which the present invention may be applied. The network processing chip 10 operates in accordance with the well-known ATM (Asynchronous Transfer Mode) protocol. Components making up the network processing chip 10 will now be briefly described.

The network processing chip 10 includes an internal memory bus 12 and a PCI interface bus 14.

An interrupt status block 16 is provided to indicate interrupts to a host processor (not shown) which is external to the network processing chip 10. A control memory controller 18 controls an external RAM (not shown) that contains control structures utilized by the network processing chip 10. A virtual memory block 20 (VIMEM) maps virtual memory to physical memory. A packet memory controller 22 controls an external memory (not shown) which stores data received and to be transmitted by the network processing chip 10.

A physical bus interface (NPBUS) block 24 provides an interface to an EPROM (not shown) that may be used to initialize the network processing chip 10. A PCI bus interface (PCINT) block 26 provides an interface between the internal PCI interface bus 14 and an external PCI bus (not shown) which may connect the network processing chip 10 to an external host device. An internal memory arbiter (ARBIT) block 28 arbitrates access to and from the internal memory bus 12. A test/clock block 30 (CRSET, CBIST, SCLCK, CITAG) represents internal test circuitry for the network processing chip 10.

A processor core (PCORE) block 32 represents a processor built into the network processing chip 10. A memory pool control (POOLS) block 34 controls allocation of memory space and prevents any group of components of the network processing chip 10 from overutilizing memory.

A block 36 (DMA queues) represents direct memory access queues (DMAQS) used for transferring data between the internal memory bus 12 and the PCI interface bus 14.

A cell scheduler (CSKED) block 38 determines an order in which cells are transmitted by the network processing chip 10. (The present invention is concerned with a modification of the cell scheduler block 38. A further description of certain conventional functions of the cell scheduler block 38 is provided below.)

A general purpose DMA (GPDMA) block 40 transfers data between the internal memory bus 12 and the PCI interface bus 14. A cell segmentation block 42 formats data for transmission (that is, the cell segmentation (SEGBUG) block 42 builds ATM cells). A cell reassembly (REASM) block 44 receives ATM cells and packs (reassembles) frames from the received ATM cells. An asynchronous cell interface (LINKC) block 46 provides an interface to physical ports 48 (e.g., a physical interface having ports 0–3).

A bus cache (BCACHE) block 50 caches data carried on the internal memory bus 12 to speed access to the data. A receive queue management (RXQUE) block 52 queues incoming frames for storage in memory. A checksum (CHKSM) block 54 performs checksum calculations with respect to incoming data frames. A SONET (synchronous optical network) framer (FRAMR) 56 provides an interface to an optical serial link (not shown). Some details of the operation of the cell scheduler block 38 will now be described with reference to FIG. 2.

Data structures utilized in scheduling cells for transmission include a schedule data structure (also referred to as a "time wheel RAM") 60, a logical path descriptor (LPD) 62 and logical channel descriptors (LCD's) 64-1 through 64-3. Each LCD corresponds to a respective virtual channel. As is understood by those who are skilled in the art, a "virtual channel" is an arrangement for transmitting data cells from a source to a destination. The LPD 62 corresponds to a "virtual path". A virtual path is a group of virtual channels that together share an assigned amount of bandwidth. The virtual channels active in the virtual path represented by the LPD 62 are represented by a linked list 66 of LCD's 64-1 through 64-3. (Although three LCD's are shown in the linked list 66, corresponding to three virtual channels active in the virtual path represented by LPD 62, the number of active virtual channels, and, correspondingly, the number of LCD's in the linked list 66, may be more or less than three.) The schedule data structure 60 includes a plurality of entries (of which, for clarity, only one entry 68 is shown in the drawing). Each entry corresponds to a time at which a data cell is to be transmitted by the network processor 10. The entries are read in order as indicated by arrow 70. At a time when a data cell is to be transmitted, the entry of the schedule data structure 60 corresponding to that time is read. The entry in question is a pointer to either an LPD (as in the case of entry 68) or to a LCD (corresponding to a virtual channel that is not part of a virtual path).

Let it be assumed that the time has come to read entry 68 in the schedule data structure 60. The pointer in the entry 68 points to LPD 62. The LPD 62 is then accessed from memory. The LPD 62 contains scheduling information 72 for the associated virtual path. Also contained in the LPD 62 are a head pointer 74 which points to the first LCD (LCD 64-1) of the linked list 66 and a tail pointer 76 which points to the last LCD (LCD 64-3) of the linked list 66. After the LPD 64 is accessed, the head pointer 74 is read, and the indicated LCD (LCD 64-1) at the head of the linked list 66 is accessed. The LCD 64-1 contains all the information required to transmit a data cell on the associated virtual channel. A data cell for the virtual channel associated with the LCD 64-1 is accordingly transmitted in the transmit cycle corresponding to the entry 68 of the schedule data structure 60.

The LCD 64-1 is then moved to the end of the linked list 66, by updating the head pointer 74 of the LPD 62 to point to the next LCD 64-2. The tail pointer 76 of the LPD 62 is also updated to point to the LCD 64-1. In addition, the erstwhile tail LCD 64-3 is updated to point to the new tail LCD 64-1. The pointer for the LPD 62 is then written into a new slot on the schedule data structure 60 in accordance with the scheduling information 72 for the associated virtual path. That is, the rescheduling of the next cell to be transmitted for the virtual path is determined based on the contracted-for Quality of Service (QoS) for the virtual path.

The LPD 62 also includes a timestamp (not separately shown) which is indicative of the time at which the next cell for the virtual path is to be transmitted in accordance with the QoS guarantee for the virtual path. When a cell is delayed, such that the difference between the timestamp and the actual time becomes large enough, cells are transmitted for the virtual path at the peak cell rate until the difference is reduced. The difference is known as a QoS credit. Thus the timestamp also is written into the LPD upon transmission of a cell for the virtual path.

By way of contrast, for transmission of a cell for a virtual channel that is not part of a virtual path, the entry corresponding to the virtual channel (i.e., a pointer to the corresponding LCD) is read from the schedule data structure 60 and the corresponding LCD is accessed from memory. A data cell for the associated virtual channel is transmitted based on the parameters in the LCD and the next cell to be transmitted for the associated virtual channel is scheduled by placing the pointer to the LCD in an appropriate slot in the schedule data structure 60 based on scheduling information contained in the LCD.

It is noted that transmission of a cell for a virtual channel included in a virtual path entails approximately twice the control bandwidth as transmission of a cell for a virtual channel that is not part of a virtual path. This is because transmission of a cell in the case of the virtual channel that is part of a virtual path entails accessing two data structures, namely an LPD and an LCD, whereas, when the virtual channel is not part of a virtual path, only an LCD must be accessed. In practice it has been found that the increased control bandwidth for the virtual path feature may lead to a reduction in performance (throughput) for the network processor 10 when the virtual path feature is implemented.

It would be desirable to reduce the control overhead required for the virtual path feature so that the performance of the network processor 10 is improved during implementation of the virtual path feature.

SUMMARY OF THE INVENTION

According to a first aspect of the invention, a method of operating a network processor is provided. The inventive method includes maintaining a schedule indicative of respective times at which a plurality of virtual channels are to be serviced, and reading an entry from the schedule, where the entry corresponds to a current transmit cycle and the entry includes a pointer to a channel descriptor for a virtual channel to be serviced in the current transmit cycle. The inventive method further includes transmitting a data cell for the virtual channel to be serviced in the current transmit cycle, and adding to the schedule an entry which points to a channel descriptor that is pointed to by the channel descriptor for the virtual channel serviced in the current transmit cycle. The inventive method further includes writing to the channel descriptor pointed to by the channel descriptor for the virtual channel serviced in the current transmit cycle a timestamp indicative of a scheduled time for servicing a virtual channel which corresponds to the channel descriptor pointed to by the channel descriptor for the virtual channel serviced in the current transmit cycle. The transmitting of the data cell may be before, after or overlapping in time with the adding of the new entry to the schedule.

According to a second aspect of the invention, a network processor includes the following data structures: a time wheel which indicates a schedule for servicing a plurality of virtual channels, where the time wheel includes an entry that points to a first channel descriptor corresponding to one of the plurality of virtual channels, and a linked list of channel descriptors, where the linked list includes the first channel descriptor and each of the channel descriptors of the linked list corresponds to a respective virtual channel.

It may be the case that none of the channel descriptors of the linked list other than the first channel descriptor is pointed to by any entry of the schedule data structure. The network processor may further include a virtual path initialization table that points to one of the channel descriptors of the linked list.

In at least one embodiment, the linked list may be an endless linked list. Each channel of the linked list may include a first pointer that points to a channel descriptor that immediately precedes the respective channel descriptor in the linked list and a second pointer that points to a channel descriptor that immediately follows the respective channel descriptor in the linked list.

Numerous other aspects are provided, as are methods and computer program products. Each inventive computer program product may be carried by a medium readable by a computer (e.g., a carrier wave signal, a floppy disk, a hard drive, a random access memory, etc.).

With the present invention, a group of virtual channels included in a virtual path is defined by a linked list of corresponding logical channel descriptors (LCD's) without use of a logical path descriptor. The place for the virtual path in the schedule data structure is maintained by a pointer to one of the LCD's of the linked list. The control overhead required for providing the virtual path feature is reduced, thereby enhancing the efficiency of operation of the network processor.

Other objects, features and advantages of the present invention will become more fully apparent from the following detailed description of exemplary embodiments, the appended claims and the accompanying drawings.

DETAILED DESCRIPTION OF THE DRAWINGS

Figure 1A:
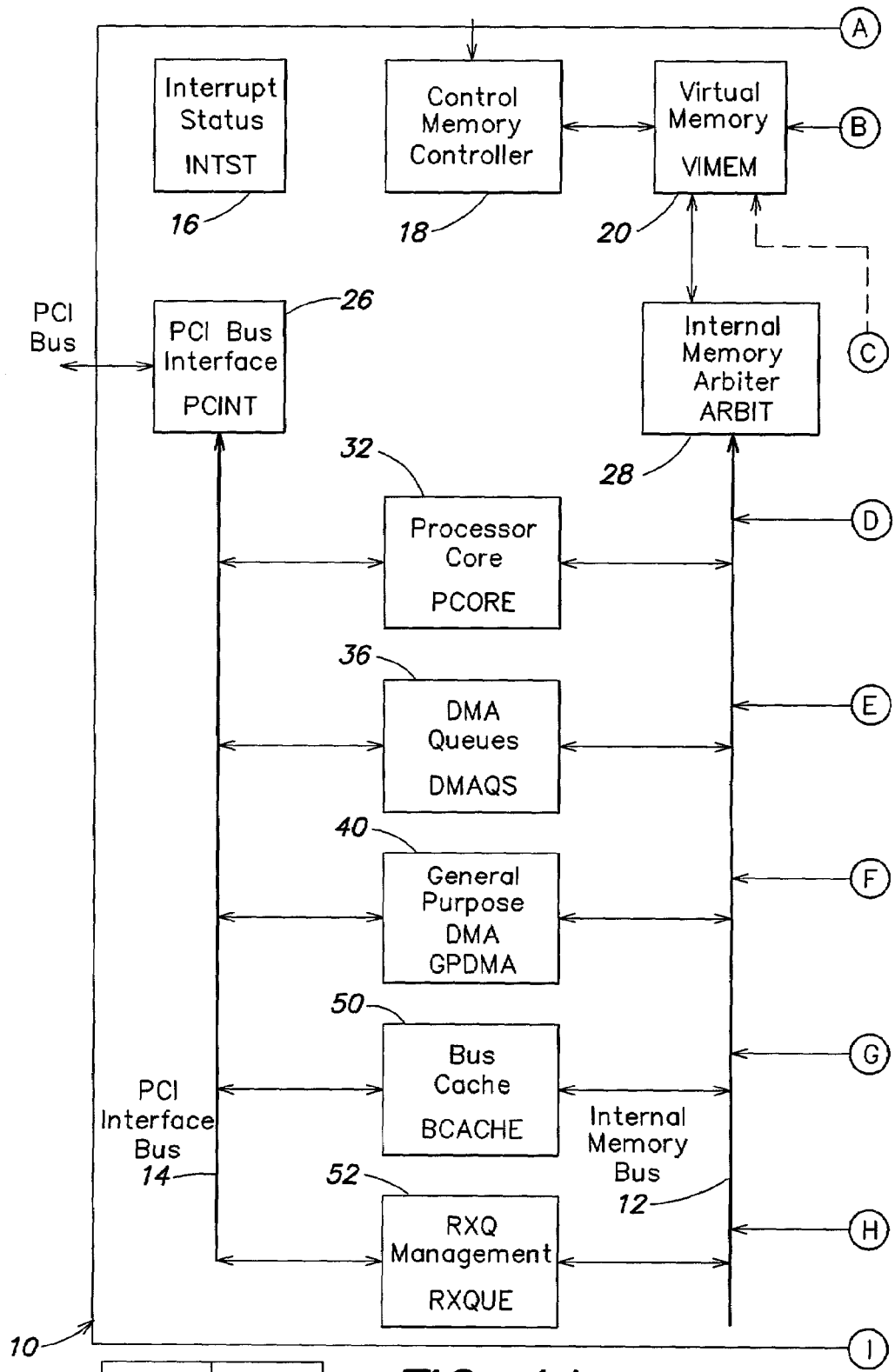
FIGS. 1A and 1B are a block diagram representation of a conventional network processing chip in which the present invention may be applied.
Figure 1B:
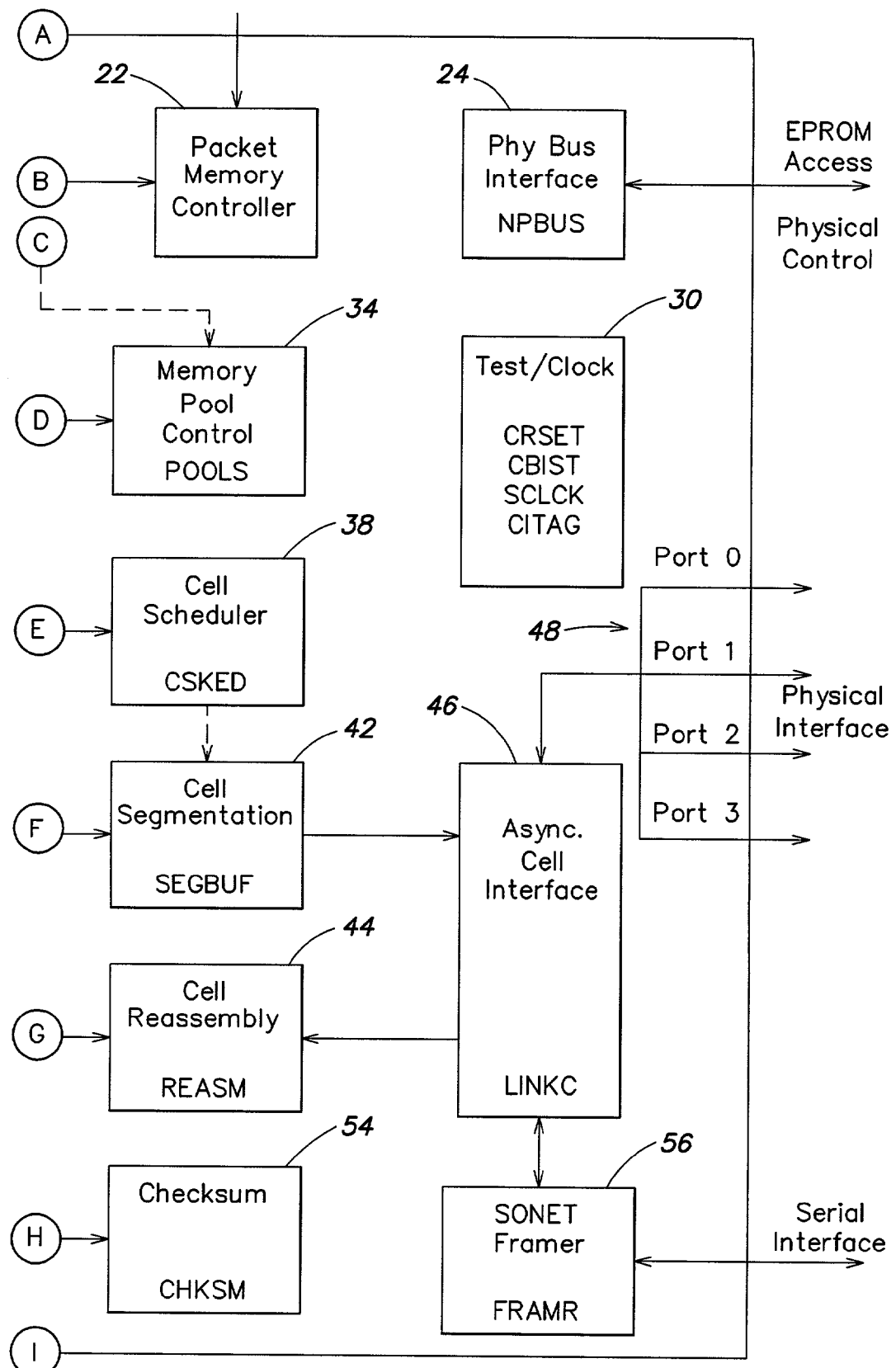

The present invention may be applied in a network processor like network processing chip 10 illustrated in FIGS. 1A and 1B. In particular, the present invention may be implemented by modifying a cell scheduler component of the NPr2.7 network processor sold by International Business Machines Corporation, the assignee of the present invention. It is also contemplated to apply the present invention in other types of network processors.

Figure 3:
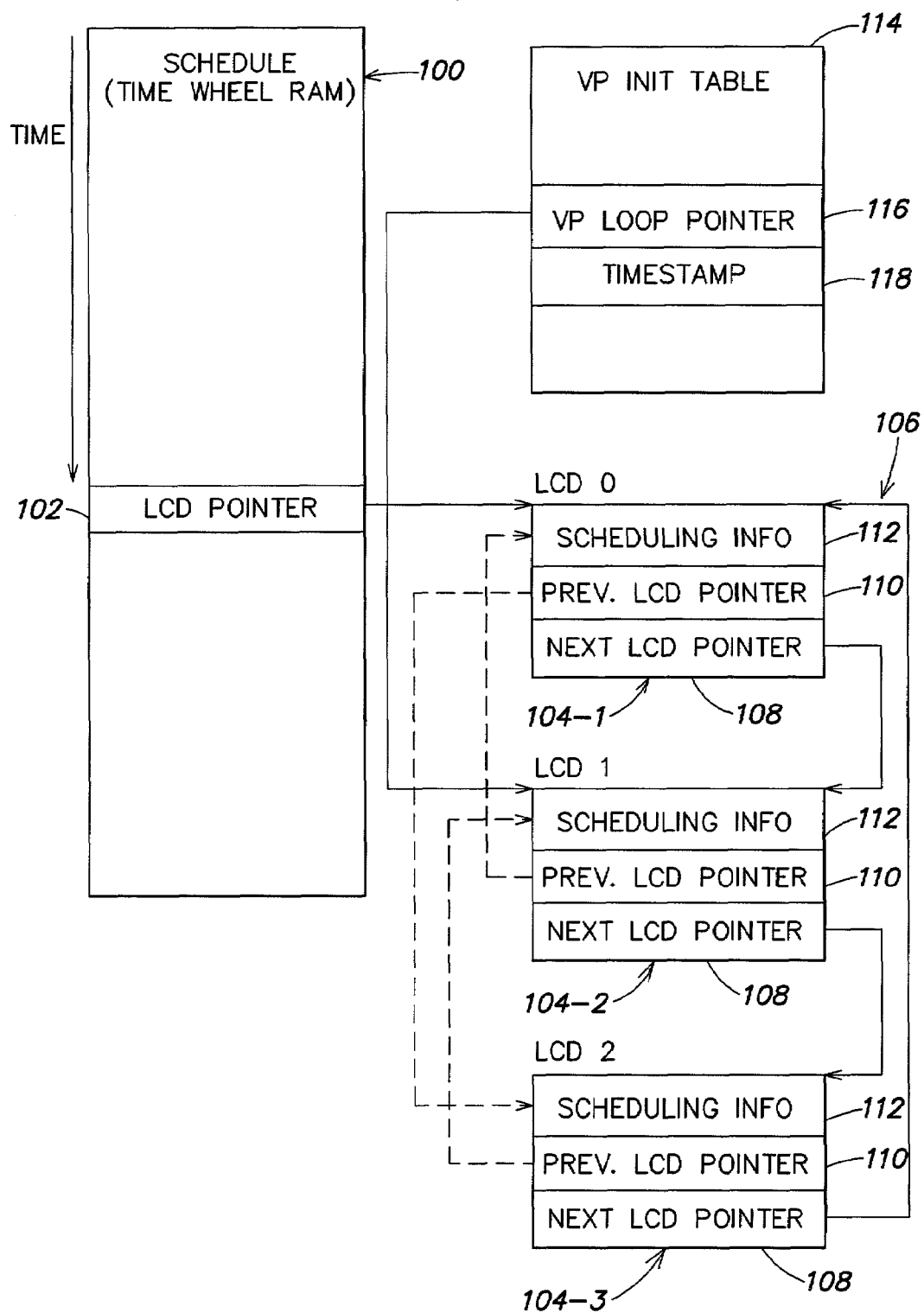
FIG. 3 schematically illustrates data structures provided in accordance with the invention for scheduling data cell transmissions in a modified version of the cell scheduler block of the network processing chip of FIGS. 1A and 1B.

FIG. 3 schematically illustrates data structures employed in accordance with the invention to implement a virtual path feature without requiring a logical path descriptor (LPD).

The inventive technique for implementing the virtual path feature utilizes a schedule data structure (time wheel RAM) 100 that may operate in the same manner as the conventional schedule data structure 60, except that in the inventive schedule data structure 100 no entry thereof points to an LPD because no LPD is employed in the technique of the present invention. Rather, every entry of the schedule data structure 100 points to a respective LCD. Some of the LCD's may not be part of a virtual path, whereas others may be. To simplify the drawing, only one entry 102 of the schedule data structure 100 is shown. In the case of the entry 102 shown in FIG. 3, the LCD pointed to (LCD 104-1) corresponds to a virtual channel that is part of a virtual path. Accordingly, as provided by the present invention, the LCD 104-1 (LCD0) is included in a linked list 106 that also includes LCD's 104-2 (LCD1) and 104-3 (LCD2). (It is assumed for the purposes of the illustrated example that there are only three active virtual channels in the virtual path represented by linked list 106, and that, accordingly, there are three LCD's included in the linked list 106. However, it is contemplated that the number of active virtual channels in a virtual path may be more or less than three, and accordingly that the number of LCD's in the linked list 106 may be more or less than three.) No other LCD of the linked list 106 is pointed to by an entry of the schedule data structure 100, except for LCD 104-1, as referred above.

The linked list 106 is "endless" in the sense that the linked list "wraps around", with every LCD of the linked list 106 pointing to an immediately following LCD in the linked list 106. A "next LCD pointer" 108 is included in each LCD 104 to point to the immediately following LCD 104 of the linked list 106.

Each LCD 104 of the linked list 106 also includes a "previous LCD pointer" 110 which points to the immediately preceding LCD 104 of the linked list 106. Also included in each LCD 104 is scheduling information 112 which, as will be seen, is used to schedule the next cell to be transmitted with regard to the virtual path. Each LCD associated with the virtual path includes the same scheduling information 112.

Each LCD 100 also includes the following data, which is not separately indicated in the drawing:

(a) a type field to indicate the kind of cells to be transmitted for the associated virtual channel;

(b) a pointer to an address in memory where the data to be transmitted is stored;

(c) a count of the remaining bytes to be transmitted and currently stored in memory;

(d) statistics regarding the number of cells and bytes transmitted for the associated virtual channel;

(e) data used to build the cell header; and (f) a partial cyclic redundancy check (CRC) which is calculated over the next cell and then stored again in the LCD 104.

The present invention also provides for a virtual path initialization (VPINIT) table 114. As will be seen, the virtual path initialization table 114 is only used for initializing new active virtual channels for the associated virtual path, and is not employed in connection with transmitting cells for virtual channels. Accordingly, the virtual path initialization table 114 is not accessed or read as part of the control process for transmitting a cell for the associated virtual path. It will also be noted that the virtual path initialization table 114 is not pointed to by any entry in the schedule data structure 100.

The virtual path initialization table 114 includes a virtual path loop pointer 116 which points to one of the LCD's 104 of the linked list 106. In the particular example shown in FIG. 3, the virtual path loop pointer 116 points to the LCD 104-2. However, the virtual path loop pointer 116 may equally well point to the LCD 104-1 or the LCD 104-3, since the virtual path loop pointer 116 is not used to indicate which is the next virtual channel to be serviced.

The virtual path loop pointer 116 may also include a timestamp 118. The timestamp 118 is used, as discussed below, to schedule the next cell in a case where the linked list 106 has become empty.

There will now be described a procedure provided in accordance with the invention whereby a data cell is transmitted for a virtual channel that is part of a virtual path. It is assumed that the time for a transmit cycle reserved for the virtual path arrives. Accordingly, the entry 102 of the schedule data structure 100 is read. Since the entry 102 points to the LCD 104-1, the LCD 104-1 is accessed and read. Information contained in the LCD 104-1 is used to transmit a data cell for the virtual channel which corresponds to the LCD 104-1. Based on the scheduling information 112 in the LCD 104-1, an entry is added to the schedule data structure 100 to schedule the next data cell to be transmitted in regard to the associated virtual path. The entry added to the schedule data structure 100 points to the next LCD in the linked list 106 (in this case, LCD 104-2). It will be noted that the next LCD is indicated by the next LCD pointer 108 of the LCD 104-1, corresponding to the virtual channel which has just been serviced. Thus the data required to place the next entry for the virtual path in the schedule data structure 100 is present in the LCD 104-1 which has been accessed and read to transmit the currently scheduled data cell.

In addition, a timestamp (not shown) indicative of the scheduled time for the next data for the associated virtual path is written to the next LCD (in this case the LCD 104-2). The timestamp written to the next LCD is used for QoS credit in the event of a delay in transmitting the next data cell for the virtual path. In one embodiment, the timestamp written into the next LCD consists of four bytes.

Figure 2:
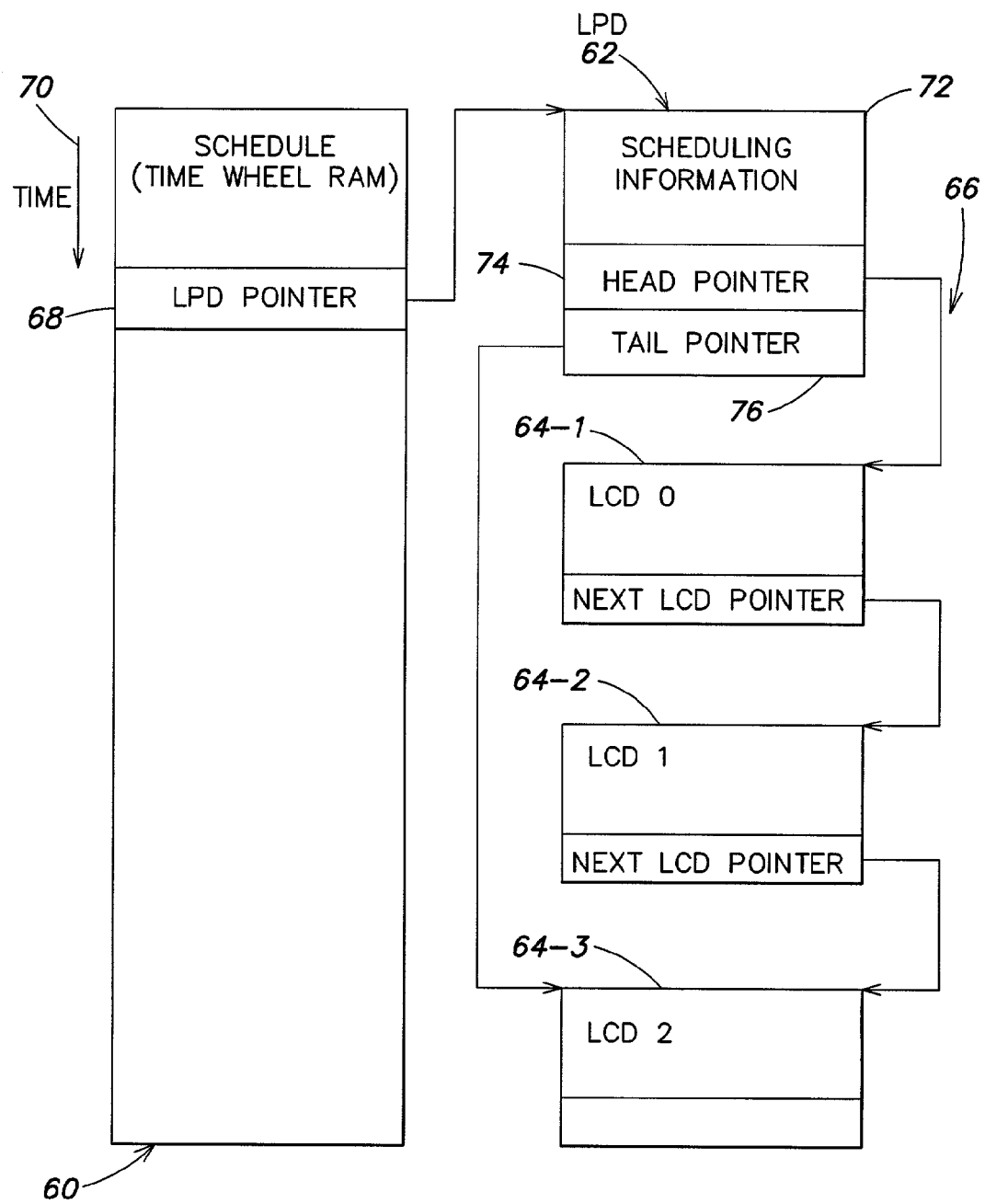
FIG. 2 schematically illustrates data structures conventionally employed in scheduling of data cell transmissions in a cell scheduler block of the network processing chip of FIGS. 1A and 1B.

It will be appreciated that the control overhead involved in sending a data cell for a virtual channel of a virtual path only entails accessing and reading one data structure (the LCD 104-1 pointed to by the entry 102 of the schedule data structure 100) and writing a timestamp (four-bytes in one embodiment although other sizes may be employed) in the next LCD (LCD 104-2). This represents a significant reduction in the control bandwidth, as compared to the prior art procedure described in connection with FIG. 2, in which an LPD must also be accessed and read. In particular, fewer control words need to be accessed in the virtual path implementation of the present invention, and fewer fetches need to be performed to access the needed control words. Thus, the performance and efficiency of operation of the network processor 10 in regard to the virtual path feature are improved by the technique of the present invention.

There will now be described procedures by which the present invention handles adding and dropping of virtual channels in regard to the virtual path represented by the linked list 106.

In the case of adding a new virtual channel (i.e. initializing a virtual channel that is part of the virtual path represented by the linked list 106), the virtual path initialization table 114 is accessed and the virtual path loop pointer 116 is read. The LCD (not shown) corresponding to the new virtual channel is inserted in the linked list 106 after the LCD 104 to which the virtual path loop pointer 116 points (in the particular case illustrated in FIG. 3, LCD 104-2). In particular, the next LCD pointer 108 of the LCD 104 pointed to by the virtual path loop pointer 116 is changed so as to point to the new LCD. The next LCD pointer of the new LCD is caused to point to the LCD that was previously pointed to by the next LCD pointer 108 of the LCD pointed to by the virtual path loop pointer 116. In addition, the previous LCD pointer 110 of the LCD to follow the new LCD (in this case the LCD 104-3) is updated so as to point to the new LCD. In addition, the previous LCD pointer of the new LCD is caused to point to the LCD pointed to by the virtual path loop pointer 116. The virtual path loop pointer 116 may, but need not, be updated to point to the new LCD which has been inserted into the linked list 106.

There will now be described the case of dropping an LCD from the linked list 106. Dropping of an LCD occurs when the data cell just transmitted exhausts the data which is awaiting transmission for the associated virtual channel. In this case, the next LCD pointer of the LCD that preceded the dropped LCD in the linked list 106 is updated to refer to the LCD which immediately followed the dropped LCD in the linked list 106. In addition, the previous LCD pointer of the LCD which immediately followed the dropped LCD is updated to point to the LCD which immediately preceded the dropped LCD. In this way, the linked list 106 is closed around the space vacated by the dropped LCD. In addition, the virtual path loop pointer 116 of the virtual path initialization table 114 is updated to point to either the LCD that followed the dropped LCD or to point to the LCD that preceded the dropped LCD.

In the special case where the LCD to be dropped is the only LCD of the linked list 106, the virtual path loop pointer 116 of the virtual path initialization table 114 is nulled, and the timestamp 118 of the virtual path initialization table 114 is updated for use in scheduling the next virtual channel that will be initialized for the virtual path corresponding to the virtual path initialization table 114.

In the case where a virtual channel is to be initialized for a virtual path and the virtual path loop pointer 116 is null (i.e., the linked list 106 is empty), the virtual path loop pointer 116 is updated to point to the LCD corresponding to the new virtual channel. The timestamp stored in the virtual path initialization table 114 is used to schedule a pointer to the LCD corresponding to the new virtual channel on the schedule data structure 100. In addition, the previous LCD pointer and the next LCD pointer for the new LCD are initialized to point to the new LCD itself.

The processes described in connection with FIG. 3 may be implemented in hardware, software or a combination thereof. In at least one embodiment of the processes described in connection with FIG. 3, the same are implemented in hardware as part of a cell scheduler module of a network processing chip. A person of ordinary skill in the art may develop logic circuitry as part of an integrated circuit that is capable of performing the inventive processes described with reference to FIG. 3.

The foregoing description discloses only exemplary embodiments of the invention; modifications of the above-disclosed apparatus and methods which fall within the scope of the invention will be readily apparent to those of ordinary skill in the art. For example, although the present invention has been disclosed in the context of a network processor employed in conjunction with the ATM protocol, it is also contemplated to apply the invention in connection with network processors that are used for other types of data communication protocol.

Accordingly, while the present invention has been disclosed in connection with exemplary embodiments thereof, it should be understood that other embodiments may fall within the spirit and scope of the invention, as defined by the following claims.

The invention claimed is:

1. A method of operating a network processor, the method comprising:
    (a) maintaining a schedule indicative of respective times at which a plurality of virtual channels are to be serviced;
    (b) reading an entry from the schedule, the entry corresponding to a current transmit cycle and including a pointer to a channel descriptor for a virtual channel to be serviced in the current transmit cycle;
    (c) transmitting a data cell for the virtual channel to be serviced in the current transmit cycle;
    (d) adding to the schedule an entry which points to a channel descriptor that is pointed to by the channel descriptor for the virtual channel serviced in the current transmit cycle; and
    (e) writing to the channel descriptor pointed to by the channel descriptor for the virtual channel serviced in the current transmit cycle a time stamp indicative of a scheduled time for servicing a virtual channel which corresponds to the channel descriptor pointed to by the channel descriptor for the virtual channel serviced in the current transmit cycle.

2. A network processor, comprising:
    means for maintaining a schedule indicative of respective times at which a plurality of virtual channels are to be serviced;
    means for reading an entry from the schedule, the entry corresponding to a current transmit cycle and including a pointer to a channel descriptor for a virtual channel to be serviced in the current transmit cycle;
    means, responsive to the means for reading, for transmitting a data cell for the virtual channel to be serviced in the current transmit cycle;
    means for adding to the schedule an entry which points to a channel descriptor that is pointed to by the channel descriptor for the virtual channel serviced in the current transmit cycle; and
    means for writing to the channel descriptor pointed to by the channel descriptor for the virtual channel serviced in the current transmit cycle a timestamp indicative of a scheduled time for servicing a virtual channel which corresponds to the channel descriptor pointed to by the channel descriptor for the virtual channel serviced in the current transmit cycle.

3. The network processor of claim 2, wherein the means for maintaining, the means for reading, and the means for adding are part of a cell scheduling component of the network processor.

4. A computer program product comprising:
    a medium, other than a carrier wave signal, readable by a computer, the computer readable medium having program code adapted to:
    maintain a schedule indicative of respective times at which a plurality of virtual channels are to be serviced;
    read an entry from the schedule, the entry corresponding to a current transmit cycle and including a pointer to a channel descriptor for a virtual channel to be serviced in the current transmit cycle;
    transmit a data cell for the virtual channel to be serviced in the current transmit cycle;
    add to the schedule an entry which points to a channel descriptor that is pointed to by the channel descriptor for the virtual channel serviced in the current transmit cycle; and
    write to the channel descriptor pointed to by the channel descriptor for the virtual channel serviced in the current transmit cycle a timestamp indicative of a scheduled time for servicing a virtual channel which corresponds to the channel descriptor pointed to by the channel descriptor for the virtual channel serviced in the current transmit cycle.

* * * * *